3,200,117
DERIVATIVES OF 1,2,4-BENZOTHIADIAZINE-7-SULFONAMIDE-1,1-DIOXIDE
Moses Wolf Goldberg, Upper Montclair, N.J., Marcel Müller, Reinach, Basel-Land, Switzerland, and Hanns Hanina Lehr, Montclair, N.J., assignors to Hoffmann-La Roche Inc., Nutley, N.J., a corporation of New Jersey
No Drawing. Filed Oct. 3, 1962, Ser. No. 227,992
6 Claims. (Cl. 260—243)

This invention relates to novel therapeutically valuable compounds. More particularly, the novel compounds of this invention are selected from the group consisting of compounds of the formula:

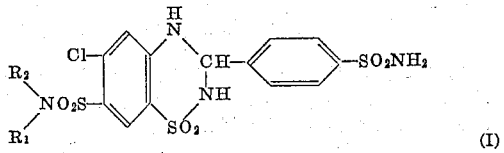

and salts thereof, wherein $R_1$ is selected from the group consisting of hydrogen and lower alkyl, and $R_2$ is selected from the group consisting of hydrogen, lower alkoxy and carboxy-lower alkoxy.

In the above formula the symbols $R_1$ and $R_2$ represent various groups which are or contain hydrocarbon radicals. These hydrocarbon radicals can be straight or branched chain groups. The lower alkyl groups include both straight and branched chain unsaturated hydrocarbon groups such as methyl, ethyl, propyl, isopropyl and the like. The lower alkyl radicals contained in the lower alkoxy and carboxy-lower alkoxy groups are radicals of the same character.

The compounds of Formula I above, and their pharmaceutically acceptable salts, are useful therapeutic agents and are particularly useful as diuretic and/or natriuretic agents. These compounds can be administered in conventional pharmaceutical dosage forms, with dosage adjusted to individual requirements. They can be administered internally, for example, orally or parenterally, and can be administered in conventional pharmaceutical administration forms, for example, in solid forms, such as tablets, capsules or the like, or in liquid forms such as suspensions, emulsions, solutions or the like. Said administration forms can contain conventional pharmaceutical excipients or adjuvants.

The novel compounds of Formula I above can be prepared by a condensation of p-sulfamoylbenzaldehyde with a compound of the formula:

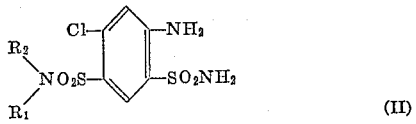

wherein $R_1$ and $R_2$ have the same meaning as above. The condensation can be effected in an inert solvent, for example, a lower alkanol, for example, ethanol, or ether, for example, bis(2-methoxyethyl)ether, or the like. Reaction is suitably effected in the presence of a catalyst such as an acid or a base. The reaction can be effected at room temperature or at an elevated temperature. It has been found, however, that an increase in temperature effects an increase in the reaction rate; and hence it is preferred to conduct the reaction at an elevated temperature.

The compounds of Formula I above form non-toxic salts with basic agents such as alkalis, e.g. alkali metal hydroxides such as sodium hydroxide, and other non-toxic bases, e.g. organic bases such as diethanolamine. These pharmaceutically acceptable salts can be obtained by dissolving a compound of Formula I in an aqueous solution of the base. The salts are soluble in water, and such solutions can be used for internal administration.

Within the class of compounds represented by Formula I, those wherein $R_2$ represents lower alkoxy or carboxy-lower alkoxy constitute a preferred group. Also, those wherein $R_1$ is hydrogen constitute a preferred group.

The following examples are illustrative but not limitative of the invention. All temperatures are stated in degree centigrade.

*Example 1*

12.6 g. of 4-amino-6-chloro-1,3-benzenedisulfonamide and 8.1 g. of p-sulfamoylbenzaldehyde were dissolved in 75 cc. of bis(2-methoxyethyl)ether, then 3 cc. of ethyl acetate saturated with hydrogen chloride was added, and the mixture heated on a steam bath for 2½ hours. The cooled solution was then added to 1 liter of 10% ice-cold aqueous hydrochloric acid, the mixture stirred for 1 hour in an ice-bath, and then allowed to reach room temperature. The resultant white precipitate was filtered off, and recrystallized from acetone-water (it crystallized with 1 mole of acetone), yielding 6-chloro-3-(4-sulfamoylphenyl) - 3,4 - dihydro - 2H-1,2,4-benzothiadiazine-7-sulfonamide 1,1-dioxide. After recrystallization from ethanol-water, the compound was obtained acetone-free and melted at 227–230° (dec.).

*Example 2*

4.5 g. of $N^3$-methyl-4-chloro-6-amino-m-benzenedisulfonamide and 2.85 g. of p-sulfamoylbenzaldehyde were dissolved in 20 cc. of bis(2-methoxyethyl)ether. Then 0.6 cc. of ethyl acetate saturated with hydrogen chloride was added to the reaction mixture, and the mixture heated to 80–100° for 1 hour, then poured into 150 cc. of ice-water. The resultant precipitate was filtered off and recrystallized from acetone-water yielding 6 - chloro - $N^7$-methyl - 3,4 - dihydro - 3 - (p-sulfamoylphenyl)-2H-1,2,4-benzothiadiazine - 7 - sulfonamide 1,1-dioxide melting at 284–285° (dec.).

*Example 3*

4.8 g. of 2 - chloro - 4-amino-5-sulfamoyl-O-methylbenzenesulfohydroxamic acid and 2.9 g. of p-sulfamoylbenzaldehyde were dissolved in 22 cc. of bis(2-methoxyethyl) ether. Then 0.4 cc. of ethyl acetate saturated with hydrogen chloride was added to the reaction mixture, the mixture heated at 80–100° for 1 hour, and poured into ice-water. The resultant precipitate was filtered off and recrystallized from acetone-water, yielding 6 - chloro - O-methyl - 3,4 - dihydro - 3 - (p-sulfamoylphenyl)-2H-1,2,4-benzothiadiazine-7-sulfohydroxamic acid 1,1-dioxide melting at 225–226° (dec.).

The above mentioned 2-chloro-4-amino-5-sulfamoyl-O-methybenzenesulfohydroxamic acid is not a part of this invention, but its preparation is disclosed hereinbelow in order that this disclosure may be complete.

100 g. of 6-chloro-2H-1,2,4-benzothiadiazine-7-sulfonamide 1,1-dioxide was added to 900 cc. of chlorosulfonic acid, and the mixture was heated to 130° for 5 hours. The cooled solution was poured on ice, the white precipitate filtered off, washed thoroughly with water, and dried in vacuo at 60°. After recrystallization from acetone-water, the so-obtained 6 - chloro - 2H-1,2,4-benzothiadiazine-7-sulfonyl chloride 1,1-dioxide melted at 257–258° (dec.).

To a solution of 14.8 g. of methoxyamine hydrochloride in 250 cc. of pyridine, there was added in portions 22 g. of 6 - chloro - 2H-1,2,4-benzothiadiazine-7-sulfonyl chloride 1,1-dioxide, and the mixture was stirred overnight at room temperature. The resulting solution was then added slowly to 750 cc. of 10% hydrochloric acid with cooling. After permitting the reaction mixture to stand for 2 hours in an ice-bath, the crystalline precipitate was filtered off, washed with water and air-dried. After recrystallization from ethanol-water, the so-obtained 6-chloro-O-methyl-2H-1,2,4-benzothiadiazine-7-sulfohydroxamic acid 1,1-dioxide melted at 244–245° (dec.).

20 g. of 6-chloro-O-methyl-2H-1,2,4-benzothiadiazine-7-sulfohydroxamic acid 1,1-dioxide was dissolved in 600 cc. of 0.5 N aqueous sodium hydroxide. The resulting solution was heated at 100° for 1 hour, and poured into ice-water. The precipitate was filtered off and recrystallized from acetone-water yielding 2-chloro-4-amino-5-sulfamoyl-O-methylbenzenesulfohydroxamic acid melting at 192–193°.

*Example 4*

10.8 g. of 2-chloro-4-amino-5-sulfamoyl-O-(carboxymethyl)-benzenesulfohydroxamic acid and 5.4 g. of p-sulfamoylbenzaldehyde were dissolved in 60 cc. of bis(2-methoxyethyl)ether. 3 cc. of ethyl acetate saturated with hydrogen chloride was then added to the reaction mixture, which was kept at room temperature for 10 days. The mixture was then poured into 600 cc. of 10% aqueous hydrochloric acid with ice-cooling and stirring. The resultant gummy pecipitate was filtered off, dissolved in 400 cc. of 2% aqueous sodium hydroxide, and the solution acidified with ice-cooling. The resultant precipitate was filtered off and recrystallized from acetone-petroleum ether, yielding 3-(4-sulfamoylphenyl)-6-chloro-O-carboxymethyl-3,4-dihydro-2H-1,2,4-benzothiadiazine-7-sulfohydroxamic acid 1,1-dioxide melting at 192–194° (dec.).

The above mentioned 2-chloro-4-amino-5-sulfamoyl-O-(carboxymethyl)-benzenesulfohydroxamic acid is not a part of this invention, but its preparation is set forth hereinbelow in order that this disclosure may be complete.

20 g. of 6-chloro-O-carboxymethyl-2H-1,2,4-benzothiadiazine-7-sulfohydroxamic acid 1,1-dioxide was dissolved in 200 cc. of 1 N aqueous sodium hydroxide. The solution was refluxed for 2 hours, and poured into 200 cc. of 10% aqueous hydrochloric acid with stirring and ice-cooling. The precipitate was filtered off and recrystallized from acetone-water, yielding 2-chloro-4-amino-5-sulfamoyl-O-(carboxymethyl)-benzenesulfohydroxamic acid melting at 220–221° (dec.).

20 g. of 6-chloro-7-chlorosulfonyl-2H-1,2,4-benzothiadiazine 1,1-dioxide and 9.4 g. of aminoxyacetic acid hemihydrochloride were suspended in 100 cc. of pyridine and the mixture stirred overnight at room temperature. The clear solution was evaporated to dryness. The residue was dissolved in 200 cc. of 10% aqueous hydrochloric acid and the solution stirred for 3 to 4 hours. A heavy precipitate was formed which was filtered off, washed with water and dried in vacuo. After recrystallization from acetone-water, the product, 6-chloro-O-carboxymethyl-2H-1,2,4-benzothiadiazine-7-sulfohydroxamic acid 1,1-dioxide, melted at 245–246° C. (dec.).

We claim:

1. A compound selected from the group consisting of compounds of the formula:

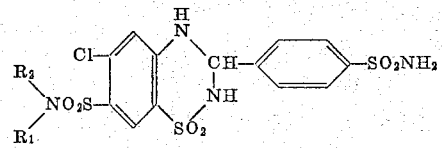

and pharmaceutically acceptable salts thereof; wherein $R_1$ is selected from the group consisting of hydrogen and lower alkyl; and $R_2$ is selected from the group consisting of lower alkoxy and carboxy-lower alkoxy.

2. 3-(4-sulfamoylphenyl)-6-chloro-O-lower alkyl-3,4-dihydro-2H-1,2,4-benzothiadiazine-7-sulfohydroxamic acid 1,1-dioxide.

3. 3-(4-sulfamoylphenyl)-6-chloro-O-(carboxy-lower alkyl)-3,4-dihydro-2H-1,2,4-benzothiadiazine-7-sulfohydroxamic acid 1,1-dioxide.

4. 3-(4-sulfamoylphenyl)-6-chloro-O-methyl-3,4-dihydro-2H-1,2,4-benzothiadiazine-7-sulfohydroxamic acid 1,1-dioxide.

5. 3-(4-sulfamoylphenyl)-6-chloro-O-carboxymethyl-3,4-dihydro-2H-1,2,4-benzothiadiazine-7-sulfohydroxamic acid 1,1-dioxide.

6. 6-chloro-3-(4-sulfamylphenyl)-3,4-dihydro-2H-1,2,4-benzothiadiazine-7-sulfonamide-1,1-dioxide.

References Cited by the Examiner

UNITED STATES PATENTS

| | | | |
|---|---|---|---|
| 3,081,301 | 3/63 | De Stevens et al. | 260—243 |
| 3,095,446 | 6/63 | Margerison et al. | 260—243 |

FOREIGN PATENTS

| | | |
|---|---|---|
| 861,367 | 2/61 | Great Britain. |
| 36,956 | 5/59 | Luxembourg. |

OTHER REFERENCES

Burger: Medicinal Chemistry, page 46 (1960).
Jour. Amer. Med. Assoc., page 466, May 24, 1958.
Wertheim: Textbook of Organic Chemistry, pages 763–764 (1945).

NICHOLAS S. RIZZO, *Primary Examiner.*